United States Patent
Tanaka (10) Patent No.: US 9,538,074 B2
(45) Date of Patent: Jan. 3, 2017

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Shin Tanaka, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 96 days.

(21) Appl. No.: 14/523,580

(22) Filed: Oct. 24, 2014

(65) Prior Publication Data
US 2015/0116546 A1 Apr. 30, 2015

(30) Foreign Application Priority Data
Oct. 29, 2013 (JP) .................. 2013-224442

(51) Int. Cl.
| H04N 5/232 | (2006.01) |
| H04N 5/262 | (2006.01) |
| G06T 5/00 | (2006.01) |
| G06T 5/20 | (2006.01) |

(52) U.S. Cl.
CPC .......... *H04N 5/23229* (2013.01); *G06T 5/002* (2013.01); *G06T 5/20* (2013.01); *H04N 5/2621* (2013.01); *G06T 2207/10028* (2013.01)

(58) Field of Classification Search
CPC ..... H04N 5/23229; H04N 5/2621; G06T 5/20; G06T 5/002; G06T 2207/10028
See application file for complete search history.

(56) References Cited

U.S. PATENT DOCUMENTS

| 7,286,168 | B2* | 10/2007 | Yamasaki | H04N 5/262 348/239 |
| 7,990,429 | B2* | 8/2011 | Saito | G06T 7/0081 348/222.1 |
| 8,717,455 | B2* | 5/2014 | Mitsumoto | H04N 5/2621 348/222.1 |
| 9,100,559 | B2* | 8/2015 | Tanaka | H04N 5/225 |
| 2002/0140823 | A1* | 10/2002 | Sakurai | H04N 5/232 348/207.99 |
| 2005/0195317 | A1* | 9/2005 | Myoga | H04N 5/23229 348/370 |
| 2005/0220358 | A1* | 10/2005 | Blonde | G06T 5/002 382/264 |

(Continued)

FOREIGN PATENT DOCUMENTS

| JP | 2005-025766 A | 1/2005 |
| JP | 2013-027023 A | 2/2013 |

*Primary Examiner* — Roberto Velez
*Assistant Examiner* — Tuan Le
(74) *Attorney, Agent, or Firm* — Canon USA Inc. IP Division (57) ABSTRACT

An image processing apparatus according to an embodiment of the present invention which performs blurring processing on captured image data based on distance information of a subject includes a dividing unit configured to divide the captured image data into a plurality of image data pieces corresponding to pieces of the distance information different from each other, a generating unit configured to generate a plurality of blurred image data pieces by performing blurring processing on the plurality of divided image data pieces including an occlusion region, and a synthesizing unit configured to synthesize the plurality of blurred image data pieces.

17 Claims, 9 Drawing Sheets

(56) References Cited

U.S. PATENT DOCUMENTS

| | | | |
|---|---|---|---|
| 2011/0188836 A1* | 8/2011 | Popkiewicz | G06Q 30/02 386/278 |
| 2012/0320239 A1* | 12/2012 | Uehara | H04N 5/2621 348/239 |
| 2013/0121537 A1* | 5/2013 | Monobe | H04N 5/23254 382/106 |
| 2013/0135494 A1* | 5/2013 | Kim | H04N 9/735 348/223.1 |
| 2013/0162861 A1* | 6/2013 | Yamamoto | H04N 13/02 348/222.1 |

* cited by examiner

IMAGE PROCESSING APPARATUS, IMAGING APPARATUS, AND IMAGE PROCESSING METHOD

BACKGROUND OF THE INVENTION

Field of the Invention

The present invention relates to an image processing apparatus which performs image processing for blurring an undesired part of an image, an imaging apparatus including the image processing apparatus, and an image processing method for performing blurring of an undesired part of an image.

Description of the Related Art

One of camera photographing techniques has been known for intentionally blurring a part excluding a subject to maximize the distinction between the part and the subject. However, because a compact digital camera has a small image pickup device, for example, a shallow depth of field may not be achieved, and therefore a sufficient blur may not be expressed. Accordingly, a technology has been proposed for adding a blur to a captured image by performing image processing. Japanese Patent Application Laid-Open No. 2005-025766 discloses a technology which uses a captured image and a distance information image to perform blurring processing including performing a convolution calculation for each distance range in order of a background and a foreground, for example, and thus generate a blurred image.

In order to perform highly accurate blurring processing on a foreground and a background, as in Japanese Patent Application Laid-Open No. 2005-025766, luminance information of a background (occlusion region) hided by a foreground must be considered. However, Japanese Patent Application Laid-Open No. 2005-025766 performs blurring processing without considering such luminance information. As a result, an image having undergone blurring processing is likely to include artifacts.

SUMMARY OF THE INVENTION

The embodiments disclosed in the present invention are directed to apparatuses and methods to prevent an artifact in image processing including blurring processing using captured image data and distance information.

An image processing apparatus according to an embodiment of the present invention which performs blurring processing on captured image data based on distance information of a subject includes a dividing unit configured to divide the captured image data into a plurality of image data pieces corresponding to pieces of the distance information different from each other, a generating unit configured to generate a plurality of blurred image data pieces by performing blurring processing on the plurality of divided image data pieces including an occlusion region, and a synthesizing unit configured to synthesize the plurality of blurred image data pieces.

Further features of the present invention will become apparent from the following description of exemplary embodiments with reference to the attached drawings.

DESCRIPTION OF THE EMBODIMENTS

The term "distance information" as used herein refers to a relative distance from a middle position of focus positions of two images to a subject, a relative distance from a focus position of either one image to a subject or an absolute distance from an imaging apparatus to a subject when imaging is performed. It should be noted that the absolute distance or relative distance may be an image-plane side distance or an object side distance. Such distances may be expressed by a distance in a real space or by a defocus amount.

The present invention will be described in detail with reference to embodiments and drawings, but it is not intended that the present invention is limited by the configurations of such embodiments.

First Embodiment

Figure 1:
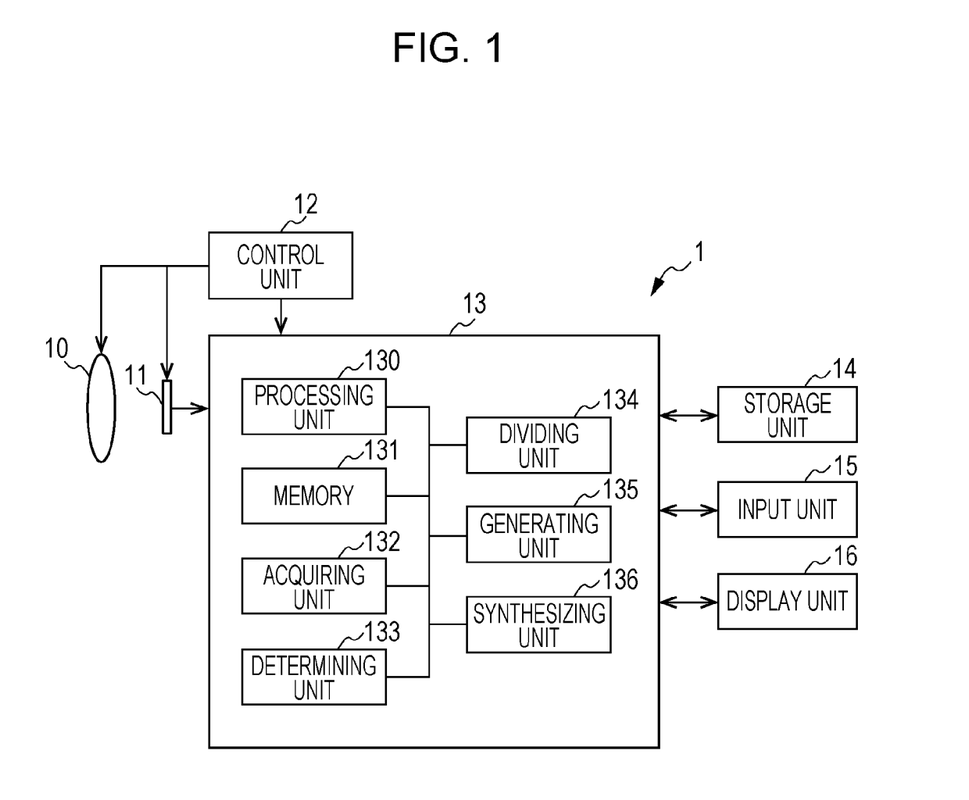
FIG. 1 is a schematic diagram illustrating an example of an imaging apparatus having an image processing apparatus according to a first embodiment.

FIG. 1 schematically illustrates a configuration of an imaging apparatus according to a first embodiment of the present invention. An imaging apparatus 1 includes an imaging optical system 10, an image pickup device 11, a control unit 12, an image processing apparatus 13, a storage unit 14, an input unit 15, and a display unit 16.

The imaging optical system 10 is an optical system having a plurality of lenses and configured to cause incident light to form an image on an image plane of the image pickup device 11. The image pickup device 11 has an image sensor such as a CCD (charge-coupled device) sensor and a CMOS (complementary metal-oxide semiconductor) sensor. The sensor may include a color filter or may be a monochromatic image pickup device or a three-plate type image pickup device.

The image processing apparatus 13 includes a processing unit 130, a memory 131, an acquiring unit 132, a determining unit 133, a dividing unit 134, a generating unit 135, and a synthesizing unit 136. The processing unit 130 has a function for performing signal processing such as A/D (analog-to-digital) conversion, noise removal, demosaicing, luminance signal conversion, aberration correction, white balance adjustment, and color correction on an analog signal output from the image pickup device 11. Digital image data (captured image data) output from the processing unit 130 are stored in the memory 131 and may be displayed on the display unit 16, be recorded (saved) in the storage unit 14, or be used for calculation of distance information or generation of distance map data. It should be noted that the distance map data here describe a distribution of distance information of a subject and may either be provided as an image data or as tabulated statistical values.

The acquiring unit 132 is configured to acquire captured image data from a signal output from the processing unit 130 and acquire distance information of a subject from the captured image data. The method for acquiring distance information of a subject may use image data pieces having different types of blur captured under different imaging conditions (Depth From Defocus or DFD method) or may use captured image data pieces having different parallaxes (stereo method). Other methods such as Time of Flight or Depth From Focus methods may be used alternatively. The acquiring unit 132 has a function for acquiring distance information of each pixel to generate distance map data. The distance information map data generated by the acquiring unit 132 may be stored in the storage unit 14 or may be temporarily stored in the memory 131 for use in subsequent processes. The acquiring unit 132 has a function for acquiring optical parameters and image pickup device parameters set for blurring processing.

The determining unit 133 is configured to determine a filter size to be used for weighted averaging process in accordance with distance information. The determining unit 133 may determine a filter size such that the filter size is increased as the distance from a focus position increases.

The dividing unit 134 is configured to divide captured image data into a plurality of image data pieces corresponding to pieces of the distance information pieces different from each other. More specifically, the dividing unit 134 is configured to gather pixels having identical distance information or pixels having distance information within an equal range and divide captured image data into image data pieces divided based on their distance information or range of their distance information.

The generating unit 135 is configured to perform blurring processing on a plurality of divided image data pieces corresponding to distance information including an occlusion region and generate a plurality of blurred image data pieces. The blurring processing may be executed by weighted averaging process using a filter.

The synthesizing unit 136 has a function for synthesizing a plurality of blurred image data pieces. The synthesizing unit 136 adds different proportions of a plurality of blurred image data pieces in a partial region, instead of addition of equal proportions of a plurality of blurred image data pieces within an image. It should be noted that the expression "addition of image data" refers to calculation of an element sum for each pixel value of pixels corresponding to image data. The term "pixel value" may refer to a value of one of luminance information and color information or both, for example.

The storage unit 14 is a non-volatile storage medium which may store captured image data, distance map data, parameter data to be used in the imaging apparatus 1 and so on. The storage unit 14 may be a large capacity storage medium from and to which data may be read or written at a high speed, a flash memory and a DRAM. The input unit 15 is an interface to be operated by a user to input information to the imaging apparatus 1 and change settings. For example, the input unit 15 may be a dial, a button, a switch, a touch panel or the like. The display unit 16 may be a liquid crystal display or an organic EL display. The display unit 16 may be used for checking a composition for imaging, viewing a captured and recorded image, and displaying a setting screen or message information.

The control unit 12 is configured to control the components of the imaging apparatus 1. The control unit 12 has functions of automatic focusing with an auto-focus (AF) function, changing of a focus position, changing an F value (diaphragm), image capturing, controlling a shutter and a flash light (both of which are not illustrated), and controlling the storage unit 14, input unit 15 and display unit 16, for example.

Figure 2:
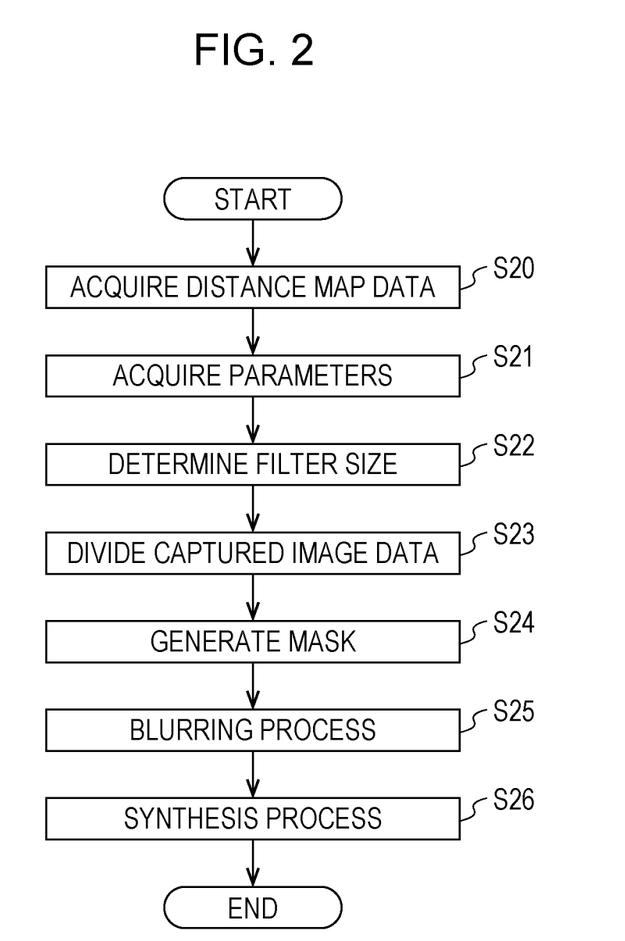
FIG. 2 is a flowchart illustrating an image processing method according to the first embodiment.

Next, an image processing method according to this embodiment will be described in detail with reference to the flowchart illustrated in FIG. 2.

In order to acquire distance map data, the acquiring unit 132 acquires distance information of a subject by using DFD method, for example, for each pixel based on captured image data acquired from a signal in the image pickup device 11 and generates distance map data (S20). The acquiring unit 132 acquires optical parameters and image pickup device parameters to be used in blurring processing (S21). The parameters may include a focal point distance, an aperture size (or F number), a size of the image pickup device 11, and the number of pixels (or pixel pitch). Parameters set for photographing may be used, or parameters may be set arbitrarily. It should be noted that the steps S20 and S21 may be performed in reverse order.

Next, the determining unit 133 determines a filter size for each distance information (S22). The filter here describes which range of pixels with respect to a focus pixel is to be applied for an averaging process and what kind of weight is to be used for the averaging process in blurring processing, which will be described below. A larger filter size allows use of values of surrounding pixels at a farther position from the focus pixel for a weighted averaging process, compared with a smaller filter size. Therefore, the filter size is increased to increase the size of a blur in blurring processing. In other words, increasing the filter size as the distance from a focus position increases may allow addition of a proper blur in blurring processing.

Figure 3:
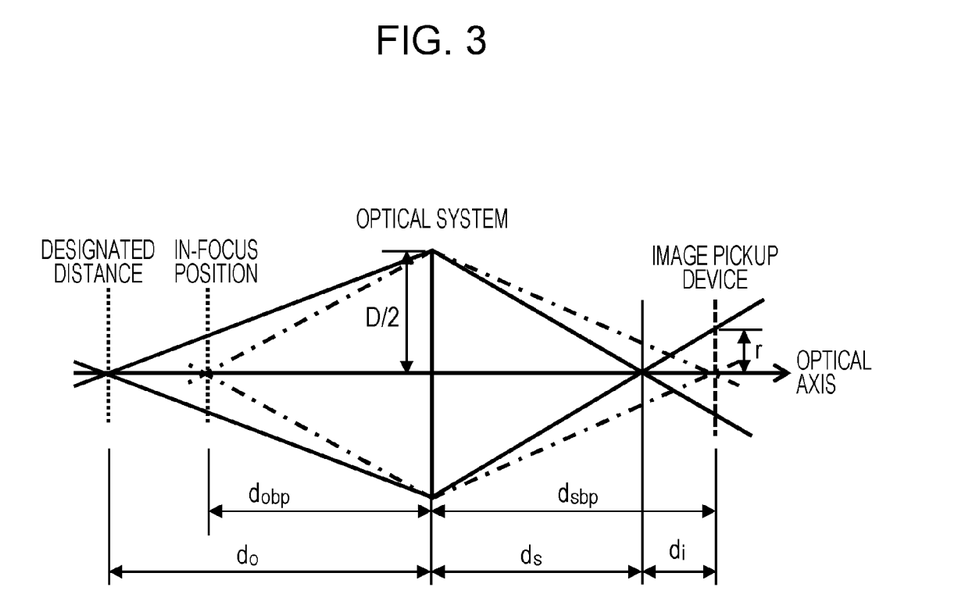
FIG. 3 illustrates a method for determining a blur size.

A specific method for setting a filter size will be described below. FIG. 3 illustrates an amount of blur (blur size r) on an image plane at a distance away from a focus position. Referring to FIG. 3, $d_o$ is distance information acquired in S20, $d_s$ is an image formation position at the distance, $d_{obp}$ is a focus position (object side), $d_{sbp}$ is an image formation position at the focus position, D is an aperture size, and $d_i$ is a amount of defocus (image plane side). The focal point distance of the imaging optical system 10 is indicated by f, and the F number is indicated by $F_{no}$. The blur size r is expressed by Expression (1) from the geometrical relationship illustrated in FIG. 3. Here, f, $d_i$, and $d_{sbp}$ satisfy Relational Expressions (2) to (4), respectively.

$$r = \frac{1}{2F_{no}} \frac{d_o - f}{d_o} d_i \quad (1)$$

$$D = \frac{f}{F_{no}} \quad (2)$$

$$d_i = d_{sbp} - \frac{fd_o}{d_o - f} \quad (3)$$

$$d_{sbp} = \frac{fd_{obp}}{d_{obp} - f} \quad (4)$$

The determining unit 133 uniquely determines a blur size r from the distance information acquired in S20 and the parameters acquired in S21. The determining unit 133 may uniquely determine a filter size in accordance with the blur size r. Thus, the determining unit 133 associates one filter size based on the distance information to each pixel of captured image data.

Figure 4A:
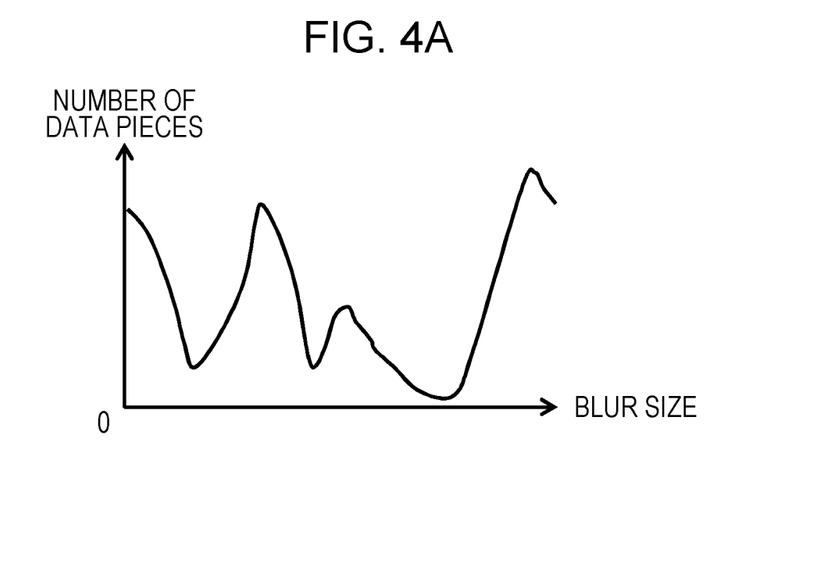
FIGS. 4A and 4B illustrate a method for determining a blur size and a filter size.

The filter size may be discretized to designated values. The discretization may advantageously reduce the number of times of the blurring processing and reduce computational complexity. In other words, the blurring processing, which will be described below, may be performed a designated number of times. The designated number here may be a predetermined value stored in the storage unit 14 or may be a value designated by a user through the input unit 15. Alternatively, the number of times of blurring processing may be determined based on a distribution of the number of data of blur sizes. For example, for a number-of-data distribution of blur size represented by a histogram as illustrated in FIG. 4A, the number of discretization is desirably equal to 4 equal to the number of turning points of the number of data. However, the number of discretization is not necessarily equal to the number of turning points of the number of data pieces. The upper limit of the number of discretization may be determined from viewpoints of the calculation time and calculation resources and may be optimized for highly efficient calculation.

Figure 4B:
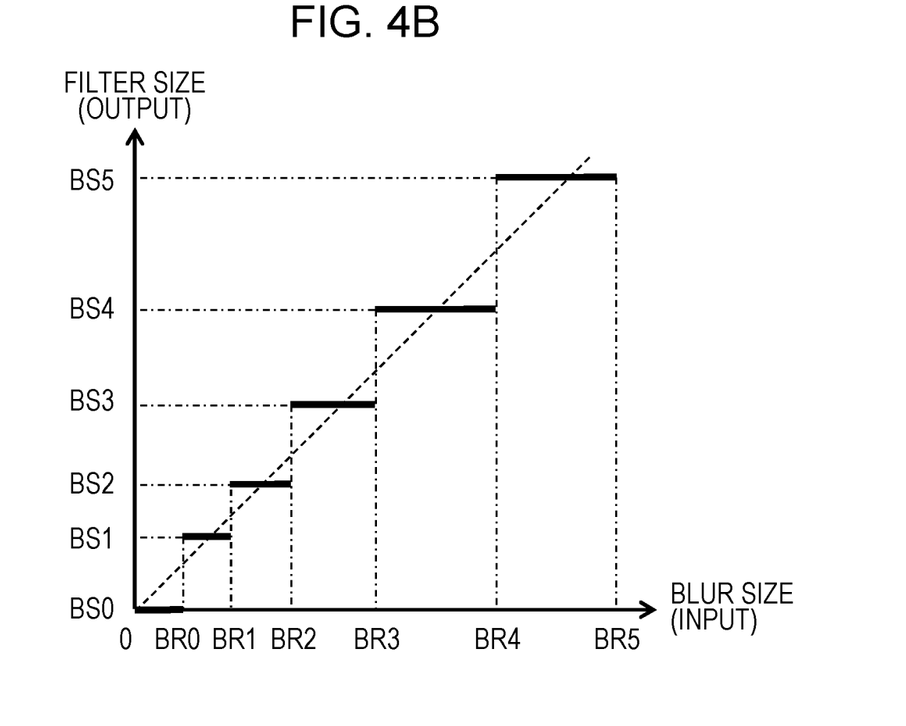

The discretization is performed such that one filter size is used in one blur size range. For example, FIG. 4B illustrates an example of discretization processing performed when the horizontal axis indicates an input value of a blur size and the vertical axis indicates an output level of a filter size. In a case where the blur size in a range equal to or higher than 0 to lower than BR, the filter size is BS0. In a case where the blur size is in a range equal to or higher than BR0 to lower than BR1, the filter size is BS1. The same is true for others.

A range of blur size may be predetermined for one filter size. The ranges of blur sizes may be defined at equal intervals or may be increased in proportion to the corresponding blur sizes as illustrated in FIG. 4B. Alternatively, a range of blur size associated with one filter size may be determined based on a distribution of number of data of blur sizes. For example, the range of each blur size may be determined such that the variance of the number of data within a range of each blur size may be reduced and that variances of blur sizes in two ranges may be increased.

The filter size within one range may be any one of a median value, an average value, a mode value, a minimum value, and a maximum value of blur sizes within a range of blur size. In the example in FIG. 4B, each filter size excluding BS0 is a median value of blur sizes within a blur size range. On the other hand, the filter size BS0 is a minimum value, that is, 0. In this case, the pixel in distance information corresponding to the blur size BR0 is at a focus position even after blurring processing is performed. Thus, pixel data of captured image data may be directly acquired, and unnecessary blurring processing may not be performed advantageously.

In general, a Gaussian distribution or columnar shape, for example, may be given as a filter shape. In this case, the filter size may correspond to a width of the Gaussian distribution or a radius of a round column. The filter shape represents a weight in an averaging process. A table of arbitrary shapes for filter sizes may be held so that the filter shape to be used may be assigned arbitrarily. Such calculations as described above are not always necessary, but a conversion table for different shapes and given conditions may be prepared for determination of a filter shape.

Next, the dividing unit 134 divides captured image data into a plurality of image data pieces corresponding to distance information (S23). More specifically, the dividing unit 134 divides an image region based on discretized filter sizes corresponding to distance information and blur sizes. In other words, the divided one image data piece corresponds to pixels corresponding to one filter size, excluding pixels corresponding to different filter sizes.

Figure 5:
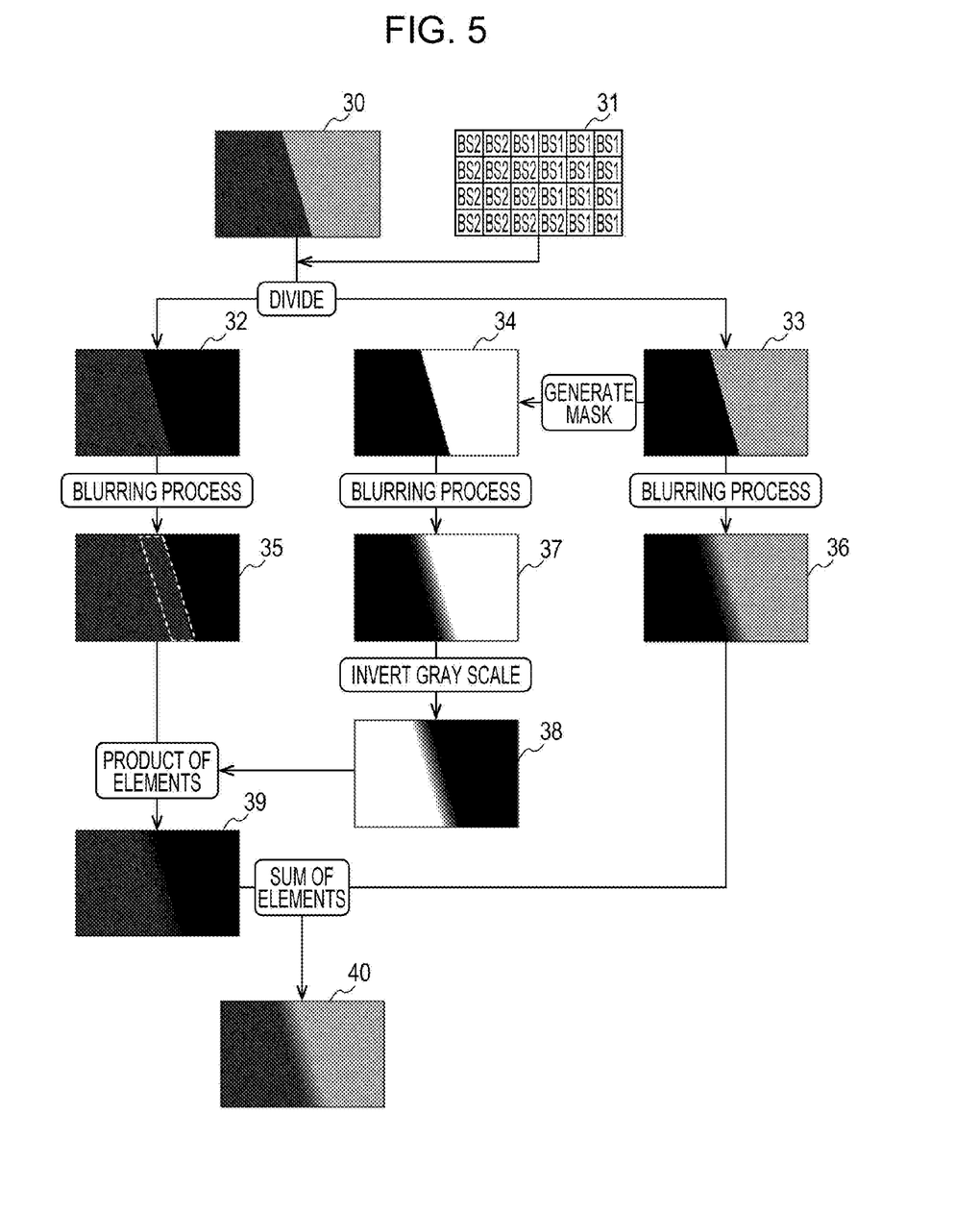
FIG. 5 illustrates an image processing method.

FIG. 5 illustrates images corresponding to image data generated by an image processing method. The image processing method will be described with reference to the images. For simplicity, a case where two filter sizes are provided will be described. In the dividing in S23, a captured image 30 is divided into images 32 and 33 based on a distance map 31. The divided image 32 contains extracted pixels corresponding to the filter size BS2. Pixels corresponding to the filter size BS1 have pixel values with no information or set to zero. On the other hand, the divided image 33 contains extracted pixels corresponding to the filter size BS1. Pixels corresponding to the filter size BS2 have pixel values with no information or set to zero. It should be noted that BS1 is smaller than (<) BS2, and the divided image 32 represents an image corresponding to distance information describing a rear side (hereinafter, called a background). The divided image 33 represents an image corresponding to distance information describing a front side (hereinafter, called a foreground).

Next, the generating unit 135 generates a mask 34 from the divided image 33 (S24). The mask 34 is different from the divided image 33 in that the pixels corresponding to the filter size BS1 has its pixel value set to 1. The mask 34 is usable for a blurring process, which will be described below. It should be noted that the mask 34 may be directly generated from the captured image 30 by the generating unit 135.

Next, the generating unit 135 performs blurring processing on the divided images 32 and 33 (S25). The blurring processing may be executed by a weighted averaging process expressed by the following expression (5):

$$I'(i, j) = \frac{\sum_n \sum_m I(i+n, j+m)F(n, m)M(i+n, j+m)}{\sum_n \sum_m F(n, m)M(i+n, j+m)} \quad (5)$$

Here, I' is a pixel value after the blurring processing is performed on the divided image 32 (or divided image 33), and I is a pixel value before the blurring processing is performed on the divided image 32 (or divided image 33). They may be calculated for each ch in a case where the subject image data are RGB 3*ch* image data. (i,j) represents a position of a focus pixel. F is a filter representing a range of surrounding pixels to be used for an averaging process and a weight in the averaging process on the focus pixel and surrounding pixels. n, m depend on the filter size and are set to cover a weight within the filter.

M is mask data for performing a weighted averaging process. More specifically, M has a value below for calculating a filter weight for the focus pixel (i,j). M has 0 in a case where the filter size corresponding to a surrounding pixel (i+n,j+m) is smaller than the filter size corresponding to the image (divided image 32 or divided image 33) subject to the calculation. M has 1 in a case where the filter size corresponding to a surrounding pixel (i+n,j+m) is equal to or larger than the filter size corresponding to the image (divided image 32 or divided image 33) subject to the calculation. In other words, M has 0 in a case where the surrounding pixel (i+n,j+m) is in a foreground with respect to distance information corresponding to an image (divided image 32 or divided image 33) subject to the calculation. M has 1 in a case where it has identical distance information or is in a background. Because the filter size corresponds to distance information in 1 to 1 manner, the filter size may be replaced by distance information through the following description is given with reference to filter sizes. The value of M may be determined from a given blur size or distance map data.

Figure 6A:
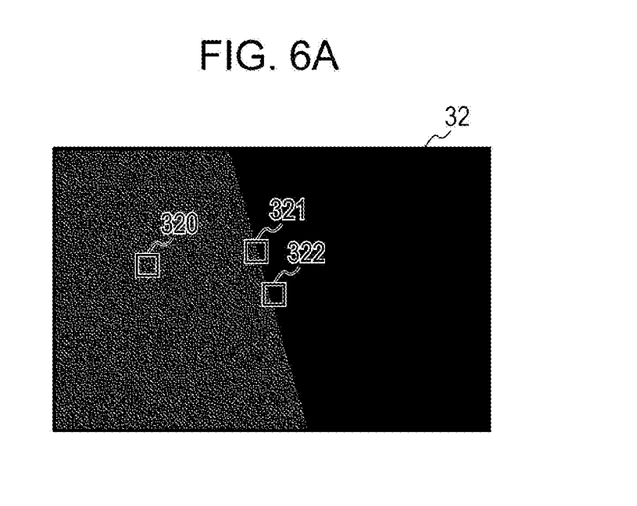
FIGS. 6A to 6C illustrate a method for performing blurring processing on a background.
Figure 6B:
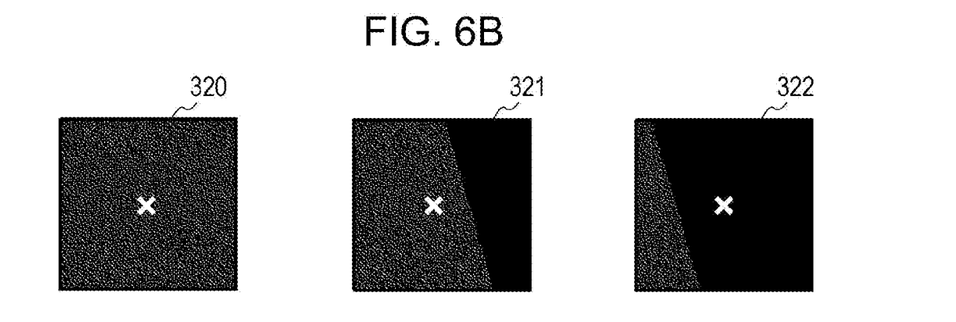

First, there will be described blurring processing to be performed on the divided image 32 which is a background with a larger filter size. FIG. 6A illustrates the divided image 32. Though the weighted averaging process using Expression (5) above is performed on all pixels within the divided image 32 in reality, weighted averaging processes will be described which are to be performed on distinctive focus pixels within three regions 320 to 322 in the divided image 32. FIG. 6B illustrates an enlarged view of the regions 320 to 322 illustrated in FIG. 6A. The regions 320 to 322 represent data on I in predetermined regions about different focus pixels. All pixels within the region 320 belong to a region with an equal filter size to a filter size to be used in the blurring processing on the divided image 32. In the region 321, the focus pixel (indicated by x) belongs to the same region to that of the filter size used for the blurring processing on the divided image 32 but partially includes a region with a smaller filter size. In the region 322, the focus pixel (indicated by x) belongs to a region with a smaller filter size than the filter size used for blurring processing on the divided image 32. In other words, the focus pixel in the region 322 belongs to an occlusion region.

Figure 6C:
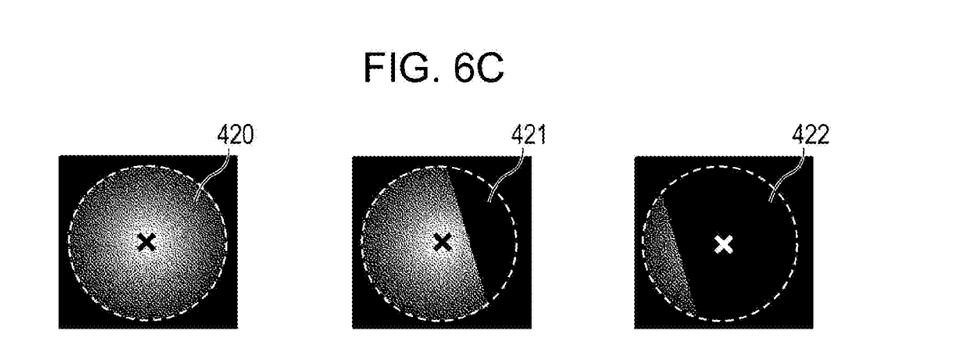

FIG. 6C illustrates distributions 420 to 422 of the product of F and M in Expression (5) at focus pixels within the regions 320 to 322. More specifically, FIG. 6C illustrates, in order from the left side, the distribution 420 at the focus pixel within the region 320, the distribution 421 at the focus pixel within the region 321, and the distribution 422 at the focus pixel within the region 322. The illustrated gray parts represent parts with the product of F and M not equal to zero, and the illustrated black parts represent parts with the product of F and M equal to zero. In a weighted averaging process on the focus pixel within the region 320, because all pixels within a filter range have an equal filter size, M has 1 independent of n and m. Thus, the distribution 420 is the filter F itself. On the other hand, the distributions 421 and 422 have shapes partially missing from the filter F. This is because the weight with M is equal to 0, that is, a smaller region than the filter size to be calculated exists within the range of the filter F. Use of those distributions 421 and 422 to perform a weighted averaging process may allow calculation with high accuracy of a pixel value after blurring processing is performed on the occlusion region.

By performing a weighted averaging process by using Expression (5), blurring processing is performed on the divided image 32. A blurred image 35 in FIG. 5 is a result of the blurring processing performed on the divided image 32. The region surrounded by the broken line in the blurred image 35 represents a result of the blurring processing performed on the occlusion region. This processing allows calculation of a pixel value after the blurring processing is performed on the occlusion region in the background divided image 32, without calculating the pixel value of the occlusion region. The range of the occlusion region whose pixel value after blurring is calculated by the generating unit 135 is a part of the region corresponding to a foreground.

Figure 7A:
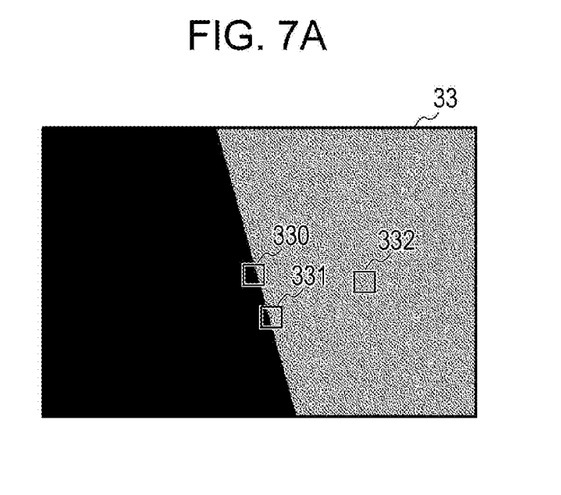
FIGS. 7A to 7C illustrate a method for performing blurring processing on a foreground.
Figure 7B:
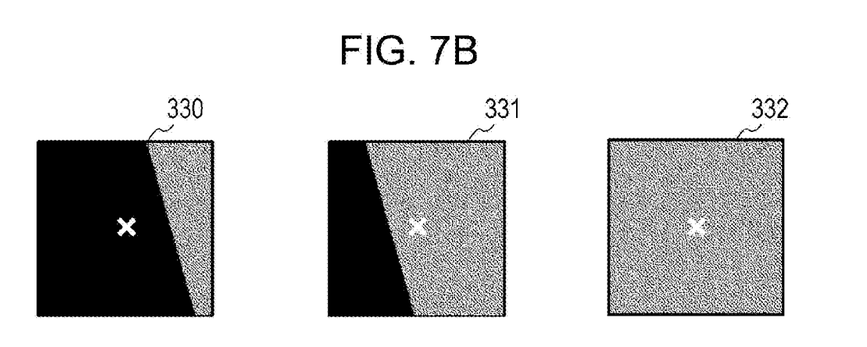
Figure 7C:
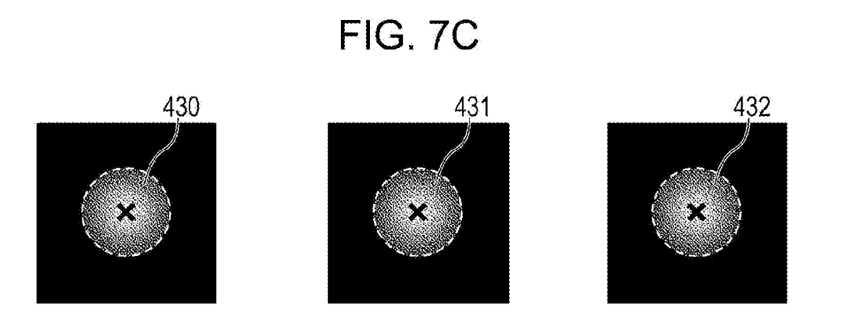

Next, blurring processing will be described which is to be performed on a foreground divided image 33 with a smaller filter size. FIG. 7A illustrates the divided image 33, and FIG. 7B illustrates enlarged views of three distinctive regions 330 to 332 from the divided image 33, similarly to FIG. 6B. FIG. 7C illustrates distributions 430 to 432 of the product of F and M in Expression (5) at focus pixels within the regions 330 to 332. More specifically, FIG. 7C illustrates, in order from the left side, the distribution 430 at the focus pixel within the region 330, the distribution 431 at the focus pixel within the region 331, and the distribution 432 at the focus pixel within the region 332. The illustrated gray parts represent parts with the product of F and M not equal to zero, and the illustrated black parts represent parts with the product of F and M equal to zero.

Because the divided image 33 is a foreground image, a region corresponding to a smaller filter size than the filter size to be used for blurring processing on the divided image 33 is not included in the divided image 33. Therefore, M is always 1, and the resulting distribution of the product of F and M is the filter F itself. It should be noted that the size of the filter corresponding to the foreground divided image 33 is smaller than the size of the filter corresponding to the background divided image 32. A blurred image 36 in FIG. 5 is generated by performing blurring processing on the divided image 33. This blurring processing may result in an effect that the blurred image 36 appears to have a blur in a part corresponding to a boundary part of the filter sizes BS1 and BS2. This is because, in the divided image 33, the pixel value of the pixels positioned in BS2 is equal to zero and the pixel value may be reflected to the calculation result. On the other hand, in the blurred image 35, the M value is equal to zero in the part where the pixel value of pixels positioned in BS1 in the divided image 32 is equal to zero. Therefore, the result is not reflected to the calculation result in the blurring processing.

The generating unit 135 performs also on a mask 34 the similar blurring processing to the processing performed on the divided image 33 to generate a mask 37. The generating unit 135 inverts the gray scale of the mask 37 to generate a mask 38. The mask 38 represents a proportion to be added in synthesizing images after blurring processing, which will be described below. More specifically, the mask 37 represents a blurring processing result of the mask 34 for BS1 and thus represents a data diffusion amount (energy diffusion amount) of BS1. Thus, the mask 38 acquired by inverting the gray scale of the mask 37 represents a region still lacking data only with BS1, that is, the amount of data to be compensated with the already calculated information of a region (background side) of a larger filter size. In other words, the mask 37 represents a proportion that requires information of a background (divided image 32) for blurring processing to be performed on a foreground (divided image 33) and is handled as a transparency. The transparency may take a value in a range equal to or higher than 0 to equal to or lower than 1. In the mask 38, the white part represents 1, and the black part represents 0. The gray part of the mask 38 represents a value higher than 0 and lower than 1. The mask 38 allows, in synthesis processing, which will be described below, addition of the pixel value of an occlusion region after the blurring processing to the pixel value corresponding to the occlusion region within the foreground blurred image 36 by changing the proportion in at least a partial region of the occlusion region.

Finally, the synthesizing unit 136 performs image synthesis by using the blurred images 35 and 36 and the mask 38 having undergone the blurring processing in S25 (S26). First of all, the synthesizing unit 136 calculates an element product of the background blurred image 35 and the mask 38 and generates the image 39. This corresponds to changing, within an occlusion region, the proportion of the pixel value after the blurring processing in the occlusion region. The range of an occlusion region for which pixel value is to be calculated by the blurring processing must include an entire range where the proportion to be added is not equal to zero.

In other words, in a case where the range of an occlusion region for which pixel value is to be calculated by the blurring processing does not even a part of the range where the proportion to be added is not equal to zero, a pixel for which the element product does not consider the occlusion region may occur, possibly causing an artifact.

Next, the synthesizing unit 136 calculates an element sum of the image 39 corresponding to the background and the foreground image 36 and synthesizes an image acquired by performing blurring processing on a background divided image and an image acquired by performing blurring processing on a foreground divided image. As a result, an image 40 is generated.

The processing above allows proper calculation of a pixel value after blurring processing is performed on an occlusion region and generation of the image 39 by applying transparency with the mask 38 to the pixel of the blurred image 35 including the pixel value. As a result, a more natural blurred image without significant artifact may be acquired.

Having described a case where two filter sizes are used, for example, the same calculations may be performed in cases where three or more filter sizes are used. The blurring processing is performed on images in order from the background side, and the synthesis processing is then performed thereon. For example, describing three filter sizes BS0, BS1, and BS2 (0<BS0<BS1<BS2), the image 40 is calculated by the aforementioned method as illustrated in FIG. 5. Then, a blurred image and mask corresponding to BS0 are generated, and an element product of the mask and the image 40 is calculated. By calculating an element sum of the image of the element product and the blurred image corresponding to BS0, a synthesized image is generated.

Second Embodiment

Figure 8:
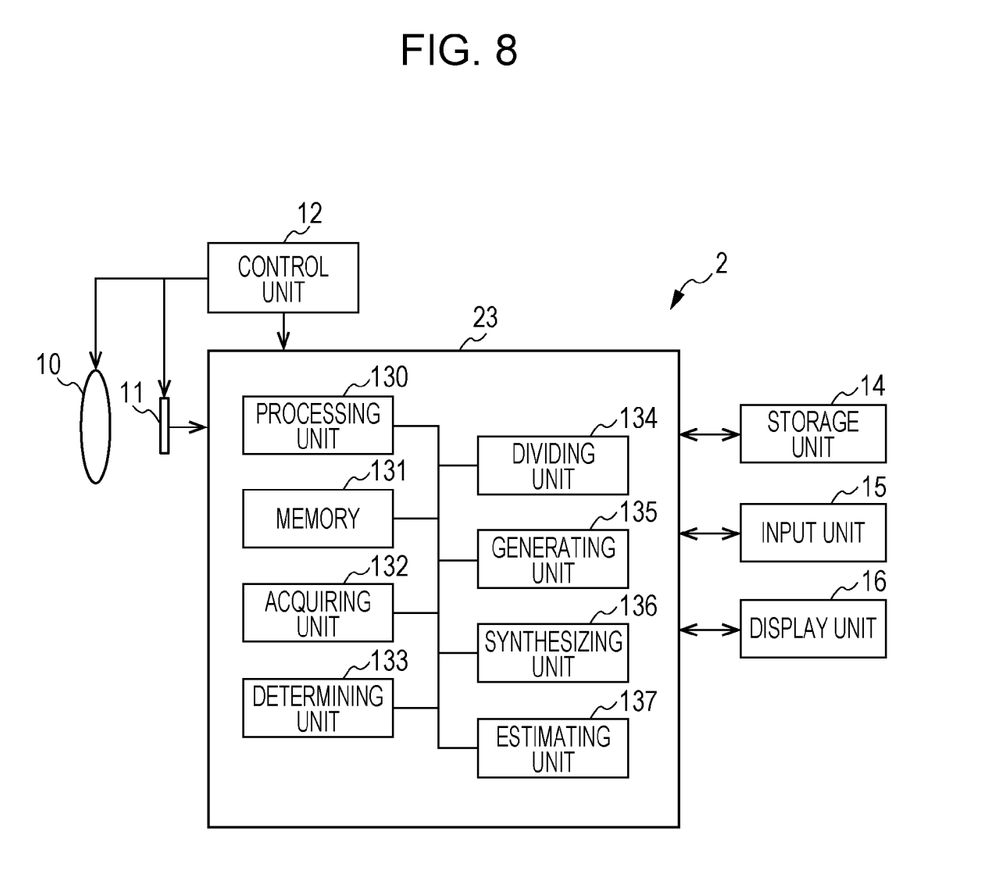
FIG. 8 is a schematic diagram illustrating an example of an imaging apparatus having an image processing apparatus according to a second embodiment.

FIG. 8 schematically illustrates a configuration of an imaging apparatus 2 including an image processing apparatus 23 according to a second embodiment. The image processing apparatus 23 is different from the image processing apparatus 13 according to the first embodiment in that it further includes an estimating unit 137 configured to estimate a pixel value of an occlusion region, in addition to the components of the image processing apparatus 13.

Figure 9:
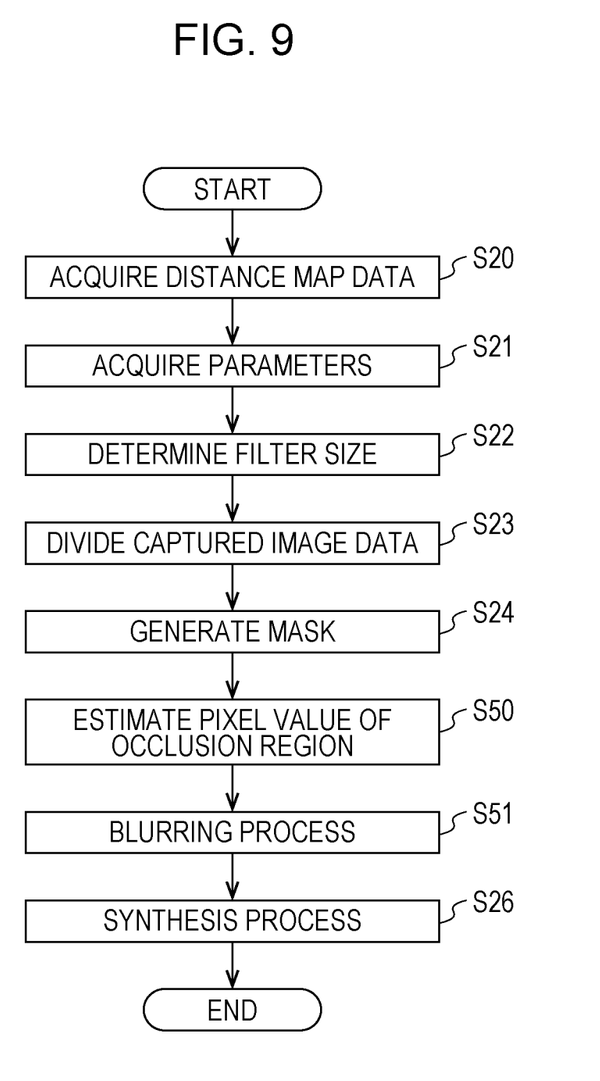
FIG. 9 illustrates a flowchart of an image processing method according to the second embodiment.

The image processing method of the first embodiment calculates a pixel value of an occlusion region after blurring processing, without estimating a pixel value of the occlusion region. On the other hand, the image processing method of this embodiment includes estimating a pixel value of an occlusion region by the estimating unit 137. Performing blurring processing by using the estimated pixel value allows calculation of a pixel value of the occlusion region after the blurring processing. FIG. 9 is a flowchart illustrating the image processing method according to this embodiment. This embodiment will be described with focus on differences from the first embodiment.

Because the processing up to S24 is the same as that of the first embodiment, the description will be omitted. In order to estimate a pixel value of an occlusion region, the estimating unit 137 estimates a pixel value of a part which does not have information corresponding to a part with BS1 of the divided image 32 in FIG. 5 (S50). An image acquired by adding the pixel value estimated in S50 to the divided image 32 is held. Any method may be applied for the estimation. For example, in order to acquire a boundary part that smoothly connects a part corresponding to BS2 of the divided image 32 and a part without information, interpolation may be performed thereon by using information of the part corresponding to BS2. Alternatively, a similar pattern to an occlusion region may be found from a part corresponding to BS2 of the divided image 32, and the information may be used to estimate a pixel value of an occlusion region. The estimation of a pixel value of an occlusion region may not necessarily be performed on all parts without information, but pixel values of parts enough for the subsequent synthesis processing may be estimated. In other words, the range of an occlusion region for which a pixel value is estimated includes all ranges having proportions to be added being not equal to at least zero in the subsequent synthesis processing. More specifically, the range for which a pixel value of an occlusion region is to be estimated may be equal to or higher than a sum of the size of BS1 and the size of BS2 from the boundary part of BS1 and BS2. By selecting such an occlusion range, the range of an occlusion region for which a pixel value after blurring processing by the generating unit 135 is calculated includes all ranges having proportions to be added being not equal to zero. On the other hand, the divided image 33 in FIG. 5 does not contain an occlusion region.

Next, blurring processing is performed on the image acquired by adding the pixel value estimated in S50 to the divided image 32 and the divided image 33 (S51). The blurring processing is performed by a weighted averaging process expressed by the following Expression (6):

$$I'(i, j) = \frac{\sum_n \sum_m I(i+n, j+m)F(n, m)}{\sum_n \sum_m F(n, m)} \quad (6)$$

Here, I is a pixel value of an image acquired by adding the pixel value estimated in S50 to the divided image (or the divided image 33). I' is a pixel value after the blurring processing is performed with respect to I. They may be calculated for each ch for RGB 3ch image data, for example. (i,j) represents a focus pixel to be calculated. F is a filter representing a range of surrounding pixels to be used for an averaging process and a weight in the averaging process on the focus pixel and surrounding pixels. n, m depend on the filter size and are set to cover a weight within the filter. Expression (6) does not have M in Expression (5). By performing the blurring processing, the blurred image 35 in FIG. 5 is generated from the image acquired by adding the pixel value estimated in S50 to the divided image 32. The blurred image 36 in FIG. 5 may be generated from the divided image 33 similarly to the first embodiment. Because the blurring processing to be performed on the mask 34 and the subsequent processing (S26) are the same as those in the first embodiment, the description will be omitted.

Third Embodiment

The image processing method of the present invention may be applicable to, for example, an image processing apparatus (image processing engine) mounted in an imaging apparatus such as a digital camera, a camcorder, and a surveillance camera, or an image processing apparatus or a computer which performs image processing on image data acquired by such an imaging apparatus. The technology of the present invention is also applicable to electronic apparatuses (including a cellular phone, a smart phone, a Slate terminal, and a personal computer) internally containing such an imaging apparatus or such an image processing apparatus. Having described that according to the aforementioned embodiments, the functions of the image processing apparatus are built in the main body of an imaging apparatus, the functions of the image processing apparatus may be configured arbitrarily. For example, the image processing apparatus may be incorporated into a computer having an imaging apparatus, and the computer may acquire and image captured by the imaging apparatus. Thus, the distance calculation may be performed based on the captured image. The image processing apparatus may be incorporated into a computer network accessible in a wired or wireless manner such that the computer may acquire a plurality of images over a network and performs the distance calculation based on them. The acquired distance information may be usable for image processes such as divisions of images into regions, generation of a three-dimensional image or a depth image, and emulation of a blur effect.

The specific implementation to the apparatus may be performed either in software (program) or in hardware. For example, a program may be stored in a memory of a computer (such as a microcomputer and an FPGA) internally contained in an imaging apparatus, and the computer may be caused to execute the program to implement processes according to the present invention. A special processor such as an ASIC may be provided to implement all or a part of processes of the present invention by using a logical circuit. Accordingly, the term "unit" used herein may be implemented as a hardware element by using a logical circuit, as a software module (program) stored in memory and executed by a processor, and as a combination of hardware and software elements.

Embodiments of the present invention can also be realized by a computer of a system or apparatus that reads out and executes computer executable instructions recorded on a storage medium (e.g., a tangible non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224442 filed Oct. 29, 2013, which is hereby incorporated by reference herein in its entirety.

What is claimed is:

1. An image processing apparatus which performs blurring processing on captured image data based on distance information of a subject, the apparatus comprising:

a dividing unit configured to divide the captured image data into a plurality of image data pieces corresponding to pieces of the distance information different from each other;

a generating unit configured to generate a plurality of blurred image data pieces by performing blurring processing on the plurality of divided image data pieces; and a synthesizing unit configured to synthesize the plurality of blurred image data pieces, wherein the plurality of divided image data pieces includes a first divided image data piece corresponding to a first distance information piece and a second divided image data piece corresponding to a second distance information piece that indicates a more rear side than the first distance information piece, wherein the generating unit generates a first blurred image data piece by performing the blurring processing on the first divided image data piece and generates a second blurred image data piece by performing the blurring processing on the second divided image data piece and an occlusion region, and wherein the synthesizing unit adds pixel values of the occlusion region after the blurring process to pixel values of a region of the first blurred image data piece corresponding to the occlusion region, and a different proportion is used for the adding of the synthesizing unit in at least a partial region within the occlusion region.

2. The image processing apparatus according to claim 1, wherein the generating unit performs blurring processing on the occlusion region and calculates a pixel value after blurring processing of the occlusion region.

3. The image processing apparatus according to claim 2, wherein the blurring processing is implemented by an averaging process using a filter representing a range of surrounding pixels to be used for at least the averaging process; and a size of a filter to be used for blurring processing on a divided image data piece corresponding to a distance information piece describing a background side is larger than a size of a filter to be used for blurring processing on a divided image data piece corresponding to a distance information piece describing a foreground side.

4. The image processing apparatus according to claim 3, wherein blurring processing on a focus pixel is performed by using the filter and mask data that indicate 0 if a size of a filter corresponding to the surrounding pixels is smaller than a filter size corresponding to the focus pixel and indicate 1 if it is equal to or larger than the filter size corresponding to the focus pixel.

5. The image processing apparatus according to claim 3, wherein the filter further represents a weight for averaging process on the focus pixel and surrounding pixels.

6. The image processing apparatus according to claim 1, the apparatus further comprising an estimating unit configured to estimate a pixel value of the occlusion region, wherein the generating unit performs blurring processing on the occlusion region by using the estimated pixel value and calculates a pixel value after the blurring processing of the occlusion region.

7. The image processing apparatus according to claim 6, wherein the blurring processing is implemented by an averaging process using a filter representing a range of surrounding pixels to be used for at least the averaging process; and a size of a filter to be used for blurring processing on a divided image data piece corresponding to a distance information piece describing a background side is larger than a size of a filter to be used for blurring processing on a divided image data piece corresponding to a distance information piece describing a foreground side.

8. The image processing apparatus according to claim 7, wherein the filter further represents a weight for averaging processes on the focus pixel and surrounding pixels.

9. The image processing apparatus according to claim 1, wherein a range of the occlusion region for which a pixel value is calculated by the blurring processing includes an entire range where the proportion to be added is not zero.

10. The image processing apparatus according to claim 1, wherein the generating unit generates mask data indicating the proportion from the captured image data; and the synthesizing unit adds pixel values by using blurred image data corresponding to distance information describing a background side including the mask and a pixel value after blurring processing of the occlusion region and blurred image data corresponding to distance information describing a foreground side.

11. An imaging apparatus comprising:

an image pickup device; and an image processing apparatus which performs blurring processing on captured image data based on distance information of a subject, wherein the captured image data is acquired from a signal of the image pickup device, the image processing apparatus comprising:

a dividing unit configured to divide the captured image data into a plurality of image data pieces corresponding to pieces of the distance information different from each other;

a generating unit configured to generate a plurality of blurred image data pieces by performing blurring processing on the plurality of divided image data pieces; and a synthesizing unit configured to synthesize the plurality of blurred image data pieces, wherein the plurality of divided image data pieces includes a first divided image data piece corresponding to a first distance information piece and a second divided image data piece corresponding to a second distance information piece that indicates a more rear side than the first distance information piece, wherein the generating unit generates a first blurred image data piece by performing the blurring processing on the first divided image data piece and generates a second blurred image data piece by performing the blurring processing on the second divided image data piece and an occlusion region, and wherein the synthesizing unit adds pixel values of the occlusion region after the blurring process to pixel values of a region of the first blurred image data piece corresponding to the occlusion region, and a different proportion is used for the adding of the synthesizing unit in at least a partial region within the occlusion region.

12. An image processing method for performing blurring processing on captured image data based on distance information of a subject, the method comprising:

dividing the captured image data to a plurality of image data pieces corresponding to pieces of the distance information different from each other;

generating a plurality of blurred image data pieces by performing blurring processing on the plurality of divided image data pieces; and synthesizing the plurality of blurred image data pieces, wherein the plurality of divided image data pieces includes a first divided image data piece corresponding to a first distance information piece and a second divided image data piece corresponding to a second distance information piece that indicates a more rear side than the first distance information piece, wherein the generating generates a first blurred image data piece by performing the blurring processing on the first divided image data piece and generates a second blurred image data piece by performing the blurring processing on the second divided image data piece and an occlusion region, and wherein the synthesizing adds pixel values of the occlusion region after the blurring process to pixel values of a region of the first blurred image data piece corresponding to the occlusion region, and a different proportion is used for the adding of the synthesizing in at least a partial region within the occlusion region.

13. The image processing method according to claim 12, wherein the generating performs blurring processing on the occlusion region and calculates a pixel value after blurring processing of the occlusion region.

14. The image processing method according to claim 13, wherein the blurring processing is implemented by an averaging process using a filter representing a range of surrounding pixels to be used for at least the averaging process; and a size of a filter to be used for blurring processing on a divided image data piece corresponding to a distance information piece describing a background side is larger than a size of a filter to be used for blurring processing on a divided image data piece corresponding to a distance information piece describing a foreground side.

15. The image processing method according to claim 14, wherein blurring processing on a focus pixel is performed by using the filter and mask data that indicate 0 if a size of a filter corresponding to the surrounding pixels is smaller than a filter size corresponding to the focus pixel and indicate 1 if it is equal to or larger than the filter size corresponding to the focus pixel.

16. The image processing method according to claim 12, the method further comprising estimating a pixel value of the occlusion region, wherein the generating performs blurring processing on the occlusion region by using the estimated pixel value and calculates a pixel value after the blurring processing of the occlusion region.

17. An image processing apparatus which performs blurring processing on captured image data based on distance information of a subject, the apparatus comprising:

circuitry configured to:

divide the captured image data into a plurality of image data pieces corresponding to pieces of the distance information different from each other;

generate a plurality of blurred image data pieces by performing blurring processing on the plurality of divided image data pieces; and synthesize the plurality of blurred image data pieces, wherein the plurality of divided image data pieces includes a first divided image data piece corresponding to a first distance information piece and a second divided image data piece corresponding to a second distance information piece that indicates a more rear side than the first distance information piece, wherein, when generating the plurality of blurred image data pieces, the circuitry is further configured to generate a first blurred image data piece by performing the blurring processing on the first divided image data piece and generates a second blurred image data piece by performing the blurring processing on the second divided image data piece and an occlusion region, and wherein, when synthesizing the plurality of blurred image data pieces, the circuitry is further configured to add pixel values of the occlusion region after the blurring process to pixel values of a region of the first blurred image data piece corresponding to the occlusion region, and a different proportion is used for the adding of the synthesizing unit in at least a partial region within the occlusion region.

* * * * *